(12) United States Patent
Chakravarty et al.

(10) Patent No.: US 11,381,586 B2
(45) Date of Patent: Jul. 5, 2022

(54) SYSTEMS AND METHODS FOR DETECTING ANOMALOUS BEHAVIOR

(71) Applicant: Verizon Patent and Licensing Inc., Arlington, VA (US)

(72) Inventors: Shoma Chakravarty, Chevy Chase, MD (US); Manah M. Khalil, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 254 days.

(21) Appl. No.: 16/689,476

(22) Filed: Nov. 20, 2019

(65) Prior Publication Data

US 2021/0152584 A1    May 20, 2021

(51) Int. Cl.
| | |
|---|---|
| G06F 21/00 | (2013.01) |
| H04L 9/40 | (2022.01) |
| H04L 67/306 | (2022.01) |
| H04W 72/04 | (2009.01) |
| H04W 24/08 | (2009.01) |
| H04W 12/121 | (2021.01) |

(52) U.S. Cl.
CPC ........ *H04L 63/1425* (2013.01); *H04L 67/306* (2013.01); *H04W 12/121* (2021.01); *H04W 24/08* (2013.01); *H04W 72/04* (2013.01)

(58) Field of Classification Search
CPC ... H04L 63/1425; H04L 67/306; H04L 63/02; H04L 63/14; H04W 12/121; H04W 24/08; H04W 72/04; G06F 21/00; G06F 21/50

USPC .......................................................... 726/23
See application file for complete search history.

(56) References Cited

U.S. PATENT DOCUMENTS

| | | | | |
|---|---|---|---|---|
| 5,832,208 A | * | 11/1998 | Chen ..................... | H04L 63/145 726/24 |
| 8,291,504 B2 | * | 10/2012 | Padinjareveetil ..... | H04L 67/289 726/26 |
| 8,826,422 B2 | * | 9/2014 | Russell .................. | H04L 51/12 726/22 |
| 10,158,658 B1 | * | 12/2018 | Sharifi Mehr ...... | H04L 63/1425 |
| 2010/0031156 A1 | * | 2/2010 | Doyle ................... | H04L 43/022 715/736 |
| 2012/0207046 A1 | * | 8/2012 | Di Pietro .............. | H04L 43/02 370/252 |
| 2013/0198803 A1 | * | 8/2013 | Osterweil ........... | H04L 63/0236 726/1 |

(Continued)

*Primary Examiner* — Josnel Jeudy (57) ABSTRACT

A method may include monitoring calls and/or traffic on a network and identifying behavior associated with each of a plurality of user devices with respect to activity on the network. The method may also include aggregating information about the behavior associated with the user devices, determining whether the aggregated information corresponds to an anomaly with respect to usage of the network and determining, when the aggregated information corresponds to the anomaly, whether the anomaly meets a threshold based on a type of anomaly and a number of user devices affected by the anomaly. The method may further include identifying, when the aggregated information corresponds to the anomaly, user devices in an area corresponding to the anomaly, generating a notification in response to determining that the aggregated information corresponds to the anomaly and transmitting the notification to the identified user devices in the area corresponding to the anomaly.

20 Claims, 7 Drawing Sheets

(56) References Cited

U.S. PATENT DOCUMENTS

| | | | | |
|---|---|---|---|---|
| 2016/0261465 | A1* | 9/2016 | Gupta | H04L 43/04 |
| 2016/0261621 | A1* | 9/2016 | Srivastava | H04L 63/1425 |
| 2017/0053115 | A1* | 2/2017 | Healy | G06Q 20/20 |
| 2019/0273754 | A1* | 9/2019 | Ting | H04L 63/1425 |
| 2020/0005096 | A1* | 1/2020 | Calmon | G06N 20/10 |
| 2021/0042382 | A1* | 2/2021 | Freeman | G06K 9/6226 |
| 2021/0116905 | A1* | 4/2021 | Klos | G05B 23/0281 |

* cited by examiner

SYSTEMS AND METHODS FOR DETECTING ANOMALOUS BEHAVIOR

BACKGROUND INFORMATION

Telecommunication service providers typically provide wired and/or wireless services to thousands or more customers. At times, the service providers must deal with potentially malicious and/or fraudulent behavior on their networks. For example, a user's account information may be compromised, resulting in unauthorized use of the user's account privileges. As another example, an entity may send a large number of communications (e.g., electronic messages) that may overwhelm network resources/capacities and/or create nuisances for customers of the service provider. As a result, telecommunication service providers must continuously monitor their networks for potential problems.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to monitoring a network, individual users' behaviors and an aggregate behavior of multiple users with respect to use of the network to identify anomalous behavior. In an exemplary implementation, a service provide may monitor the behavior associated with individual users and combine the information to obtain aggregate behavior information over a large number of users that identifies anomalous behavior. The aggregated information may be used to determine if notifications should be transmitted to appropriate service provider personnel to initiate an investigation of the anomalous behavior or whether other actions should be taken. In some implementations, the aggregated information may also be used to generate notifications to users, such as public service type announcements.

The anomalous behavior information may also be used to determine a "blast radius" or geographic area associated with the anomalous behavior. For example, the service provider may identify a particular geographical area corresponding to the anomalous behavior, a company/entity associated with the anomalous behavior, a source/area associated with initiating the anomalous behavior, a social network associated with the anomalous behavior, etc. The service provider may then provide notifications to service provider personnel responsible for the affected areas and/or users within the blast radius.

Identifying anomalous behavior and providing alerts to the appropriate personnel and/or users may make it more likely that the service provider and/or users will be able to mitigate any potential problems/malicious behavior relatively quickly, as well as make it more likely that users will automatically obtain needed information when an anomaly is detected. The users may also receive needed information without interacting with the service provider's trouble report system and/or service provider personnel. For example, a user may automatically obtain information from the service provider regarding anomalous behavior without human interactions (e.g., without placing or receiving a telephone call to/from the service provider's trouble report system) with the service provider personnel, thereby reducing congestion/delays at the service provider's trouble report system. Identifying problems in this manner may also reduce overall network traffic, as well as improve user experience and satisfaction with respect to services that are being provided, including network monitoring services.

Implementations described herein relate to detecting anomalies within a network providing telecommunications services, such as wired and/or wireless telecommunication services. However, it should be understood that in other implementations, other types of systems/networks may be monitored for anomalies. Therefore, the term "service provider" as used herein is not limited to any specific service and may encompass many fields and services (e.g., telecommunications, medical, financial, transportation, travel, etc.).

Figure 1:
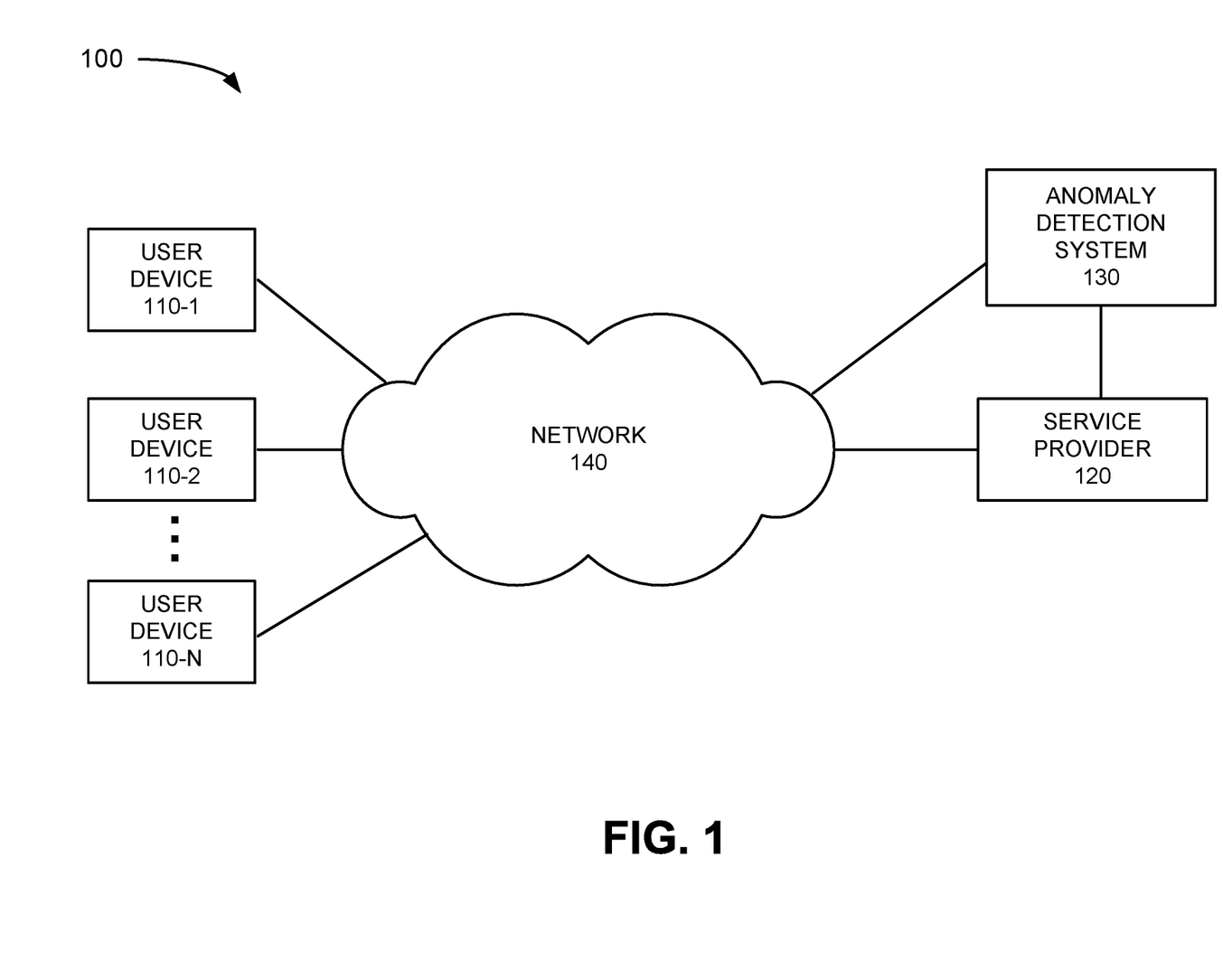
FIG. 1 illustrates an exemplary environment in which systems and methods described herein may be implemented.

FIG. 1 is a block diagram of an exemplary environment 100 in which systems and methods described herein may be implemented. Environment 100 may include user devices 110-1 through 110-N, service provider 120, anomaly detection system 130 and network 140.

User devices 110-1 through 110-N (individually referred to as user device 110-*x* or 110 and collectively as user devices 110) may include a mobile device, such as wireless or cellular telephone device (e.g., a conventional cell phone with data processing capabilities), a smart phone, a personal digital assistant (PDA) that can include a radiotelephone, etc. In another implementation, user devices 110 may include any type of mobile computer device or system, such as a personal computer (PC), a laptop, a tablet computer, a notebook, a netbook, a wearable computer (e.g., a wrist watch, eyeglasses, etc.), a game playing device, a music playing device, etc., that may include communication functionality. User devices 110 may also be implemented as machine-type communications (MTC) devices, Internet of Things (IoT) devices, machine-to-machine (M2M) devices, etc., that includes communication functionality, such as a home appliance device, a home monitoring device, a camera, etc.

User devices 110 may connect to network 140 and other devices in environment 100 (e.g., service provider 120, anomaly detection system 130, etc.) via any conventional technique, such as wired, wireless, optical connections or a combination of these techniques. User device 110 and the person associated with user device 110 (e.g., the party holding or using user device 110) may be referred to collectively as user device 110 in the description below.

Service provider 120 may include one or more computer devices and systems associated with providing services via network 140. For example, in one implementation, service provider 120 may be an entity that provides wireless services, such as cellular telephone and data services to user devices 110 via network 140, wired telephone and multimedia services, such as home telephone service, television service, etc. In other implementations, service provider 120 may provide other types of services, such as banking or financial services, medical or dental services, transportation or shipping services, online retailer services or other types of services. In the description below, assume that service provider 120 provides wired and wireless telecommunication services for a large number of users (also referred to herein as customers or subscribers). Service provider 120 may communicate with user devices 110 and/or anomaly detection system 130 to provide information regarding anomalous behavior, as described in detail below.

Anomaly detection system 130 may include one or more computing devices or systems that monitor network 140. For example, anomaly detection system 130 may monitor network usage and user behavior regarding communications generated by and/or transmitted to user devices 110. Anomaly detection system 130 may also aggregate user behavior data/information and determine whether anomalous behavior with respect to network 140 and/or user devices 110 is occurring. In one implementation, anomaly detection system 130 may generate notifications based on the behavior. The notifications may be sent to service provider personnel and users, as described in detail below. Anomaly detection system 130 may communicate with elements of network 140, such as base stations, evolved NodeBs (eNodeBs), next generation NodeBs (gNodeBs), gateways, routers, switches, etc., to perform network/user monitoring, as described in more detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of wireless stations for receiving wireless signals and forwarding the wireless signals toward the intended destinations. Network 140 may also include one or more push notification or messaging systems and corresponding applications that may receive and process the messages. Network 140 may further include one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 140 may provide packet-switched services and wireless Internet protocol (IP) connectivity to user devices 110 to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., thousands or more) of user devices 110 and multiple services providers 120 and anomaly detection systems 130. In addition, environment 100 (e.g., network 140) may include elements, such as eNodeBs, gNodeBs, base stations, switches, gateways, routers, monitoring devices, etc. (not shown), that aid in routing data and monitoring network 140.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
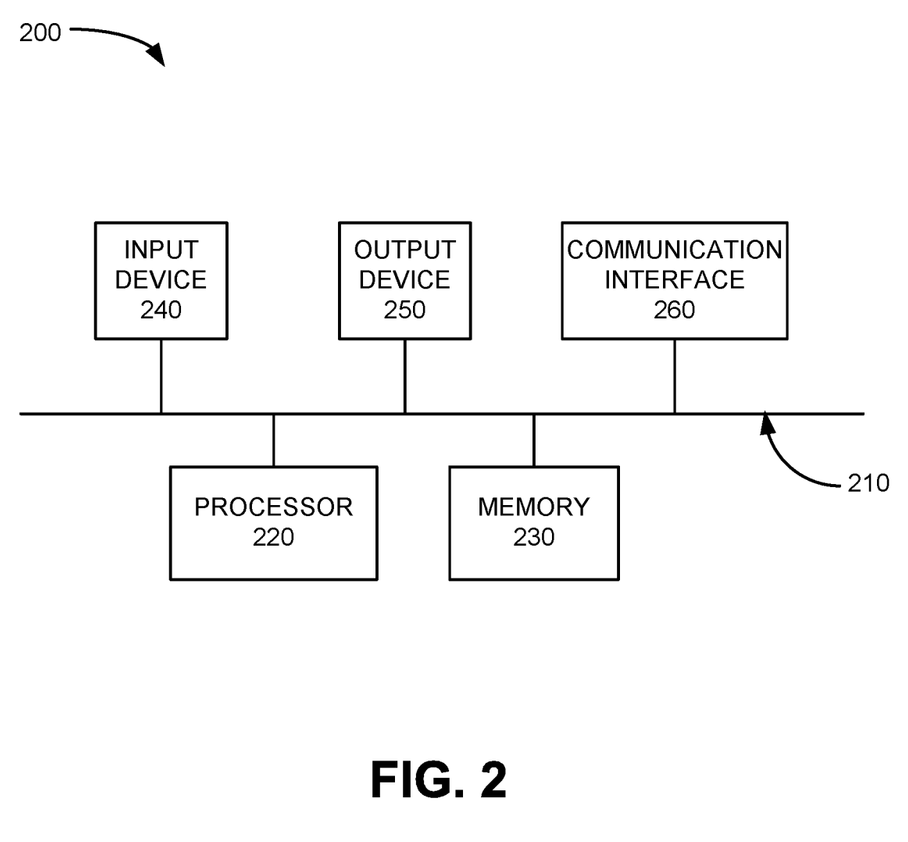
FIG. 2 illustrates an exemplary configuration of components implemented in one or more of the elements of FIG. 1.

FIG. 2 illustrates an exemplary configuration of a device 200. Device 200 may correspond to or include elements implemented in user device 110, service provider 120, anomaly detection system 130 and/or network 140. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via network 140. Communication interface 260 may also include a modem or an Ethernet interface to a LAN or other mechanisms for communicating with elements in a network, such as network 140 or another network.

The exemplary configuration illustrated in FIG. 2 is provided for simplicity. It should be understood that device 200 may include more or fewer components than illustrated in FIG. 2. In an exemplary implementation, device 200 (or other device in environment 100) performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
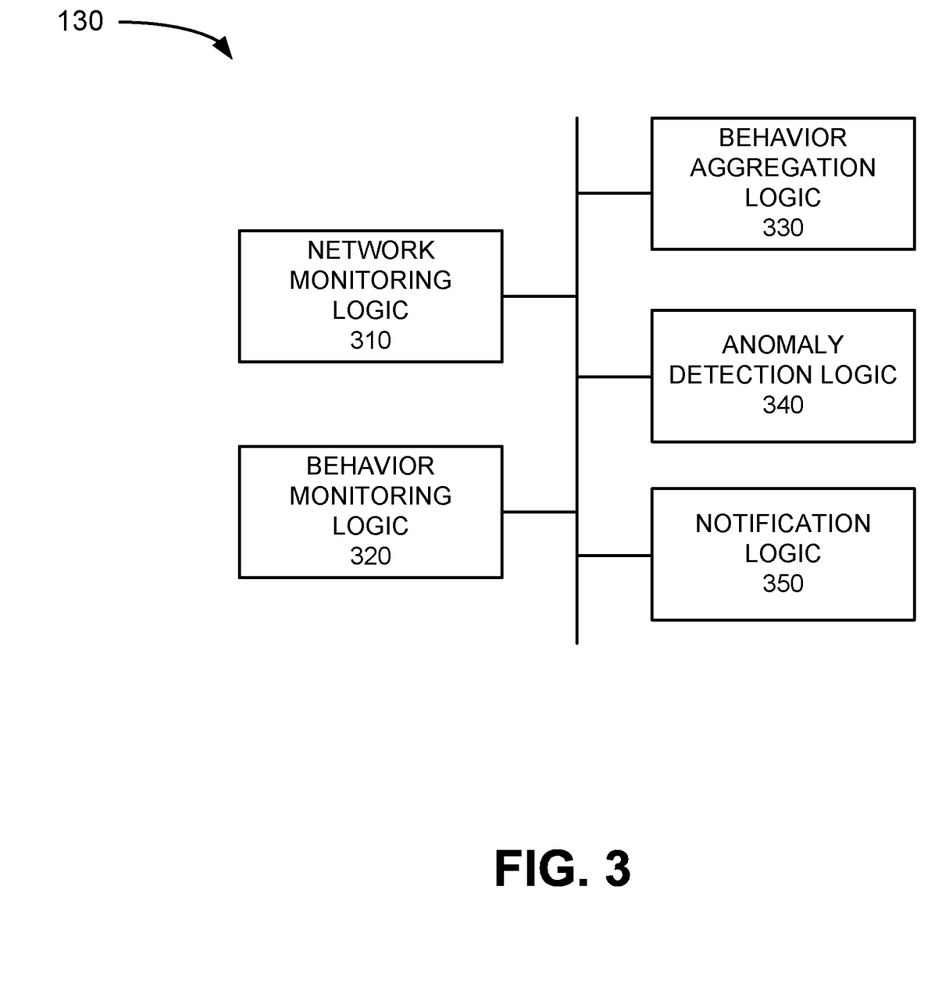
FIG. 3 illustrates an exemplary configuration of logic components included in the anomaly detection system of FIG. 1.

FIG. 3 is an exemplary functional block diagram of components implemented in anomaly detection system 130. In an exemplary implementation, all or some of the components illustrated in FIG. 3 may be implemented by processor 220 executing instructions stored in memory 230.

Referring to FIG. 3, anomaly detection system 130 may include network monitoring logic 310, behavior monitoring logic 320, behavior aggregation logic 330, anomaly detection logic 340 and notification logic 350. In alternative implementations, these components or a portion of these components may be located externally with respect to anomaly detection system 130.

Network monitoring logic 310 may include logic that monitors network 140. For example, network monitoring logic 310 may monitor overall network usage, usage with respect to particular portions of network 140, congestion on network 140, latency associated with transmitting data on network 140, data throughput with respect to various elements of network 140, such as base stations, eNodeBs, gNodeBs, routers, call volume in network 140 (e.g., volume in/out of a particular region), upload and download usage over time, etc. Network monitoring logic 310 may also identify problems or potential problems associated with network 140 and/or particular portions of network 140, as described in more detail below.

Behavior monitoring logic 320 may include logic that monitors the behavior of user devices 110. For example, behavior monitoring logic 320 may examine network usage and determine patterns associated with individual user devices 110, such as telephone call patterns, and Internet usage patterns, and/or the like. For example, behavior monitoring logic 320 may determine a number of calls over a period of time, sources of calls regardless of whether the source identifier is spoofed, destinations for calls, such as destinations having consecutive addresses or identifiers, destinations having incremental or other patterns, velocity of calls, durations of calls, Internet usage, times of Internet usage, types of Internet usage (e.g., download of media, playing of interactive games) etc. Behavior monitoring logic 320 may also detect patterns of dual-tone multi-frequency (DTMF) signaling, such as repetitive transmissions of a same sequence or transmission of incremental values. Behavior monitoring logic 320 may use the obtained usage patterns to create historical behavior information for individual user devices 110.

Behavior monitoring logic 320 may also determine whether user devices 110 are acting within their typical historical patterns. As an example, assume that user device 110-1 typically makes telephone calls on weekends to Canada and India that last approximately 30 minutes. If, however, user device 110-1 begins making telephone calls to countries to which no calls were previously made (e.g., Italy and Australia) during the week and that last 60 minutes or more, behavior monitoring logic 320 may flag this behavior as being anomalous for that particular user device 110-1. As another example, behavior monitoring logic 320 may determine that user device 110-2 is suddenly streaming a significant amount of data to user device 110-2, transmitting large amounts of data from user device 110-2, etc., that falls outside the historical pattern for user device 110-2. Behavior monitoring logic 320 may flag this streaming behavior as being anomalous for user device 110-2.

Behavior aggregation logic 330 may include logic that aggregates or combines information from behavior monitoring logic 320 and/or network monitoring logic 310. For example, behavior aggregation logic 330 may combine data from thousands or more user devices 110 and/or correlate this information with data from the network monitoring logic 310, synthesizing a complete picture of anomalous data flow or patterns. In some implementations, behavior aggregation logic 330 may aggregate behavior information based on a geographic region, user devices 110 associated with the same entity/company, network segments, or the like. For example, behavior aggregation logic 330 may aggregate data from user devices 110 located within a particular geographic area (e.g., city, suburban area, zip code, state, etc.). As another example, behavior aggregation logic 330 may aggregate data from user devices 110 associated with a particular entity, such as a company, a domain name, etc. Behavior monitoring logic 330 may determine whether data aggregated over a number of user devices 110 indicates potential fraud or other problems associated with user devices 110 and/or usage of network 140.

As an example, behavior aggregation logic 330 may determine that a large volume of calls are being placed from a particular foreign country (e.g., Mexico) to user devices 110 in New York City. As another example, behavior aggregation logic 330 may determine that a large number of user devices 110 are placing calls to an emergency services provider, such as the fire department, an electric utility, etc. As still a further example, a large number of calls may be received in a geographical area in which a natural disaster (e.g., a hurricane) is occurring/has recently occurred. In each case, behavior aggregation logic 330 may aggregate behavior information, including behavior data that is not in accordance with historical patterns associated with usage of network 140 by user devices 110.

In an exemplary implementation, behavior monitoring logic 330 may include machine learning modules/units that examine individual user device 110 behavior and aggregate the information for a number of different categories of behavior. For example, the machine learning module may aggregate the data based on location of the user devices 110, call volume type information, network topology, time of day, day of the week, etc. The machine learning module may also aggregate the data for various time periods (e.g., each month). In each case, the machine learning performed by behavior aggregation logic 330 may generate historical baselines of aggregated information that can be used to detected anomalous behavior, as well as levels/grades of anomalous behavior, as described below.

Anomaly detection logic 340 may include logic that receives information from network monitoring logic 310, behavior monitoring logic 320 and behavior aggregation logic 330 and determines whether anomalies exist. For example, anomaly detection logic 340 may examine network statistics obtained by network monitoring logic 310 and behavior aggregation logic 330 and determine whether an anomaly exists. Anomaly detection logic 340 may also determine how to address the anomalies, such as transmitting notifications to appropriate parties, automatic action to mitigate potential problems, etc., as described below. In some implementations, anomaly detection logic 340 may also include machine learning modules/units to aid in determining whether anomalies exist and whether to generate notifications based on the anomalies, as also described below. In some implementations, anomaly detection logic 340 may identify levels or grades associated with the degree of the anomaly. For example, if the aggregated behavior information identifies a significant deviation from historical or baseline behavior information, anomaly detection logic 340 may provide a high level anomaly indication and generate appropriate actions based on the high level.

Notification logic 350 may include logic that provides notifications to service provider personnel and/or user devices 110 associated with anomalous behavior. For example, anomaly detection logic 340 may signal notification logic 350 with information requesting that notification logic 350 generate and transmit notifications to, for example, network personnel associated with operating network 140, particular user devices 110, etc. Notification logic 350 may generate the notifications to the appropriate parties/devices based on the particular type of anomaly. For example, if the anomaly involves user devices 110 in a particular city, notification logic 350 may notify network personnel responsible for monitoring network 140 in that city. Notification logic 350 may also provide other types of information, such as public service type announcement when an emergency (e.g., natural disaster) has occurred. In some implementations, notification logic 350 may provide messages with links to allow user devices 110 to obtain additional information of interest regarding the anomaly via a digital platform (e.g., a television or radio channel to tune to for additional information, a website to obtain additional information, etc.). In addition, in some implementations, notification logic 350 may provide actionable notifications that allow the receivers of the notifications to immediately take actions, such as block a caller, terminate a session, etc. Real-time processing of actionable notifications can address false-positives and eliminate any adverse effect of erroneously growing the blast radius/affected users.

Although FIG. 3 shows exemplary components of anomaly detection system 130, in other implementations, anomaly detection system 130 may include fewer components, different components, differently arranged components, or additional components than depicted in FIG. 3. In addition, functions described as being performed by one of the components in FIG. 3 may alternatively be performed by another one or more of the components of anomaly detection system 130.

As described above, anomaly detection logic 340 may detect anomalies associated with user devices 110 regarding usage of network 140. In an exemplary implementation, anomaly detection logic 340 may store thresholds associated with detecting anomalies, as well as determine a blast radius/affected user devices 110 associated with the anomalies. For example, referring to FIG. 4, anomaly detection logic 340 may include threshold logic 410 and blast radius/affected user determining logic 420.

Figure 4:
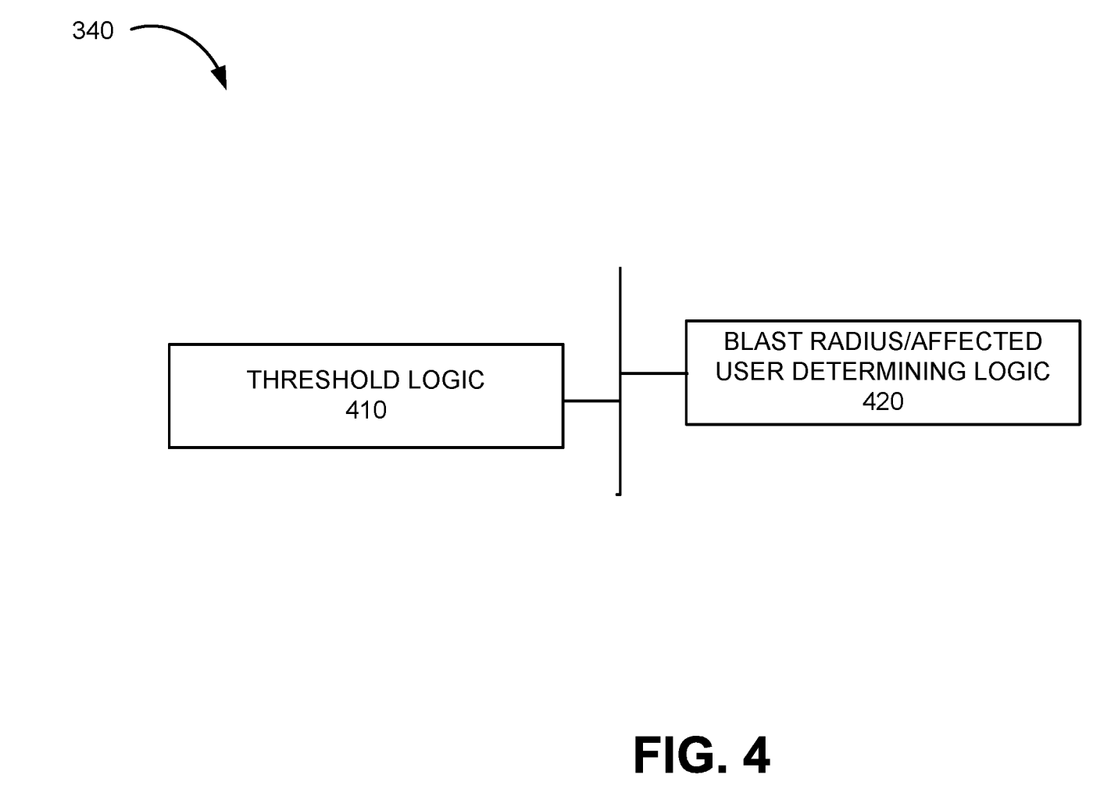
FIG. 4 illustrates an exemplary configuration of additional logic components included in the anomaly detection system of FIG. 1.

Threshold logic 410 may store one or more thresholds associated with particular types of anomalous network behavior and/or aggregated user behavior. For example, threshold logic 410 may store a threshold number of user devices 110 that must exhibit anomalous behavior before an alert or notification is generated. For example, threshold logic 410 may store information indicating that two hundred user devices 110 must be affected/experiencing anomalies with respect to a particular user behavior, such as receiving telephone calls from a particular country, receiving emails from a particular domain/location, etc., before an alert/notification is generated. Threshold logic 410 may also store threshold information associated with potential natural disasters. For example, threshold logic 410 may store information indicating that one hundred user devices 110 located within a geographical area (e.g., a city) calling an emergency services provider, such as the fire department, within a short period of time (e.g., 60 minutes) corresponds to a potential natural disaster in the particular area. The particular thresholds stored in threshold logic 410 may also be changed over time based on changes in historical patterns, machine learning associated with detecting anomalies, manually, according to a particular schedule, and/or the like.

Blast radius/affected user determining logic 420 may determine a geographic area and/or particular user devices 110 affected by anomalous behavior detected by anomaly detection logic 340. As an example, blast radius/affected user determining logic 420 may determine that a particular city or suburban area is experiencing anomalous behavior, particular user devices 110 associated with an entity/company are experiencing anomalous behavior, such as receiving a large number of communications from a same entity, etc. In other instances, blast radius/affected user determining logic 420 may determine that a network of user devices 110 connected in a social network are experiencing anomalous behavior. Notification logic 350 may use the information generated by threshold logic 410 and blast radius/affected user determining logic 420 to determine whether to generate notifications, identify affected user devices 110 and/or network personnel, and when to transmit such notifications.

Blast radius/affected user determining logic 420 may also determine a source or destination range of user devices 110, such as an NPA-NXX (i.e., the first six digits of a telephone number including the area code and exchange) range in a network that is affected by anomalous behavior detected by anomaly detection logic 340. Blast radius/affected user determining logic 420 may also determine that specific types of devices or their operating systems (OS) (e.g., user devices 110 with an Android OS) are generating or receiving higher than usual suspicious or anomalous traffic, typically indicative of a local or remotely-controlled malware.

Figure 5A:
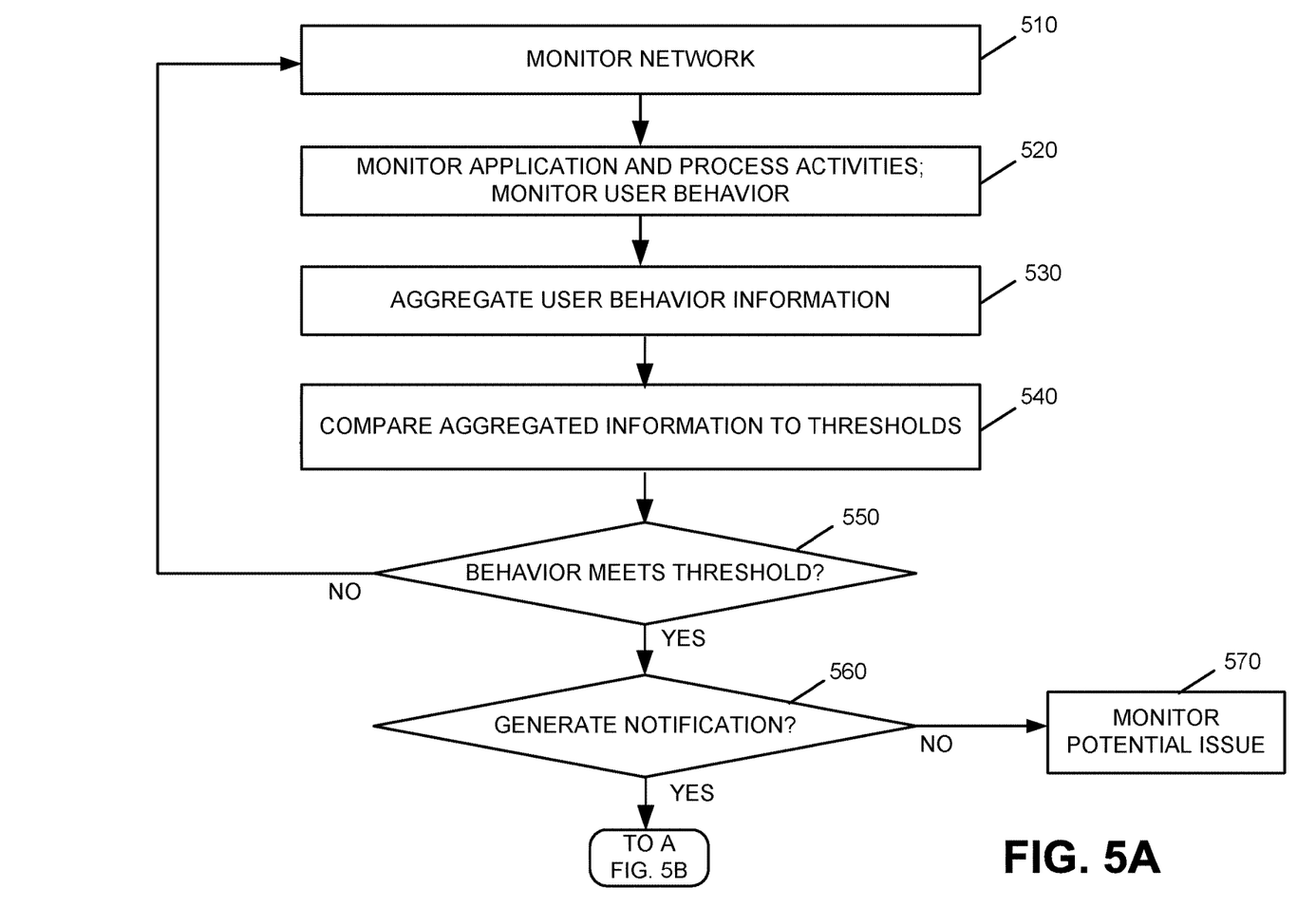
FIGS. 5A and 5B are flow diagrams illustrating processing by various components in the environment of FIG. 1 in accordance with an exemplary implementation.
Figure 5B:
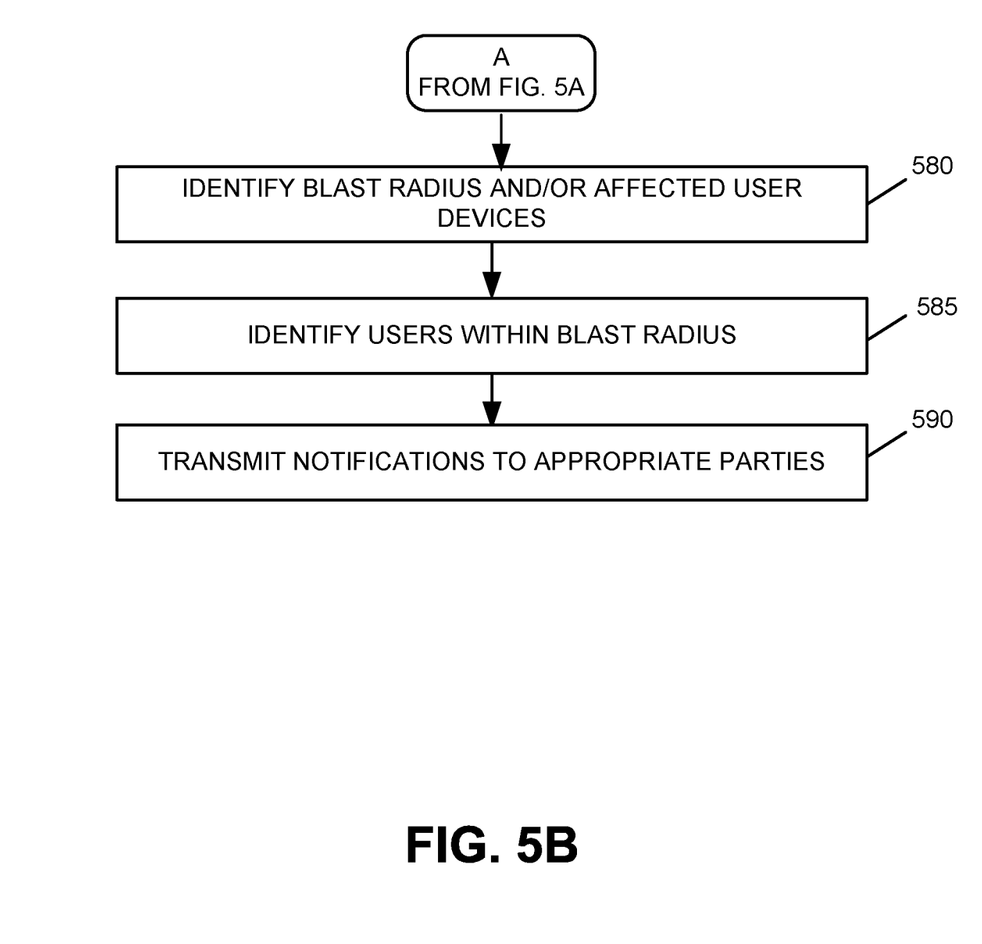

FIGS. 5A and 5B are flow diagrams illustrating processing associated with detecting anomalous behavior in environment 100. Processing may begin with anomaly detection system 130 monitoring network 140 (block 510). For example, network monitoring logic 310 may monitor activities on network 140, such as telephone calls, call volume information, Internet usage, multimedia usage, etc. Anomaly detection system 130 may also monitor individual application-related or process-related activities/use of network 140 (block 520). For example, behavior monitoring logic 320 may monitor the traffic of a particular messaging application or game that may contain malware. Anomaly detection system 130 may further monitor individual user's activities/use of network 140 (block 520). For example, behavior monitoring logic 320 may monitor individual user devices 110 with respect to usage of network 140. As an example, behavior monitoring logic 320 may monitor telephone calls placed by or received by user devices 110, including the destination of the calls, the duration of the calls, the source of the calls, etc., amounts of Internet usage, including download usage, upload usage and times associated with the usage, such as weekdays or weekends, evenings, the location of user devices 110 when using network 140 (e.g., obtained via cell tower and/or access point connections), etc.

Behavior aggregation logic 330 may aggregate the behavior information associated with user devices 110 to generate baseline activity information (block 530). For example, as discussed above, behavior aggregation logic 330 may aggregate data from user devices 110 associated with a particular geographical area (e.g., city, state, zip code), user devices 110 associated with a particular entity (e.g., a company), user devices 110 associated with a particular domain name, etc. Behavior aggregation logic 330 may also aggregate the data over particular periods of time (e.g., one day, one week, one month, etc.). Behavior aggregation logic 330 and/or anomaly detection logic 340 may then determine whether data aggregated over a number of user devices 110 indicates anomalous behavior (e.g., potential fraud or other problems) associated with user devices 110 and/or usage of network 140, such as a large volume of calls and/or electronic communications are being placed/transmitted from a particular foreign country to user devices in New York City has occurred during a particular week, a large number of calls from user devices 110 in a particular city are being placed in a short period of time (e.g., 60 minutes) to a fire department, a 911 call center, an electric utility, etc.

Anomaly detection logic 340 may compare the aggregated user behavior and network monitoring to one or more threshold (block 540). For example, threshold logic 410 may store information identifying types of anomalies and a corresponding number of user devices 110 that must be involved in the anomaly before a threshold is reached. As an example, anomaly detection logic 340 may access threshold logic 410 and determine that the threshold associated with user devices 110 receiving calls over a one day period from a particular foreign country for which the user devices 110 do not historically receive any calls is two hundred fifty user devices 110.

Anomaly detection logic 340 may then determine whether the identified anomaly meets the threshold (block 550). If anomaly detection logic 340 determines that the anomaly does not meet the threshold (block 550—no), processing may return to block 510 and monitoring of network and user device 110 behavior continues. If, however, anomaly detection logic 340 determines that the aggregated user device 110 behavior meets the threshold (block 550—yes), anomaly detection logic 340 may determine whether to generate a notification (block 560). For example, certain types of anomalies, such as anomalies regarding Internet usage may not require notifications to network personnel and/or user devices 110. If anomaly detection logic 340 determines that a notification is not needed (block 560—no), anomaly detection logic 340 may continue to monitor the anomaly (block 570). For example, anomaly detection logic 340 may flag the anomaly as a potential issue and continue to monitor the anomaly.

If, however, anomaly detection logic 340 determines that a notification should be generated (block 560—yes), anomaly detection logic 340 may identify a blast radius/affected user devices 110 associated with the anomaly (FIG. 5B, block 580). For example, blast radius/affected user determining logic 420 may determine a geographic area and/or particular user devices 110 affected by anomalous behavior detected by anomaly detection logic 340. As an example, blast radius/affected user determining logic 420 may determine that a particular city is experiencing anomalous behavior. As another example, blast radius/affected user determining logic 420 may determine that user devices 110 associated with a particular entity/company are experiencing anomalous behavior etc. Notification logic 350 may use the information associated with the particular type of anomaly and identify the appropriate parties within the blast radius, such as parties to whom to transmit the notification (block 585).

For example, some types of notifications should be sent to personnel associated with managing network 140 for service provider 120. Other types of notifications may also be sent to user devices 110 directly associated with and/or affected by the anomaly. In each case, notification logic 350 may transmit the notifications to the appropriate parties (block 590). For example, notification logic 350 may send an alert to user devices 110 indicating that unusual call activity is affecting user devices 110 in the user's area and to be on the alert for potentially malicious activity, such as calls or electronic communications from a particular country. In addition, notification logic 350 may automatically send alerts to network personnel responsible for monitoring the particular area of network 140 for service provider 120.

Figure 6:
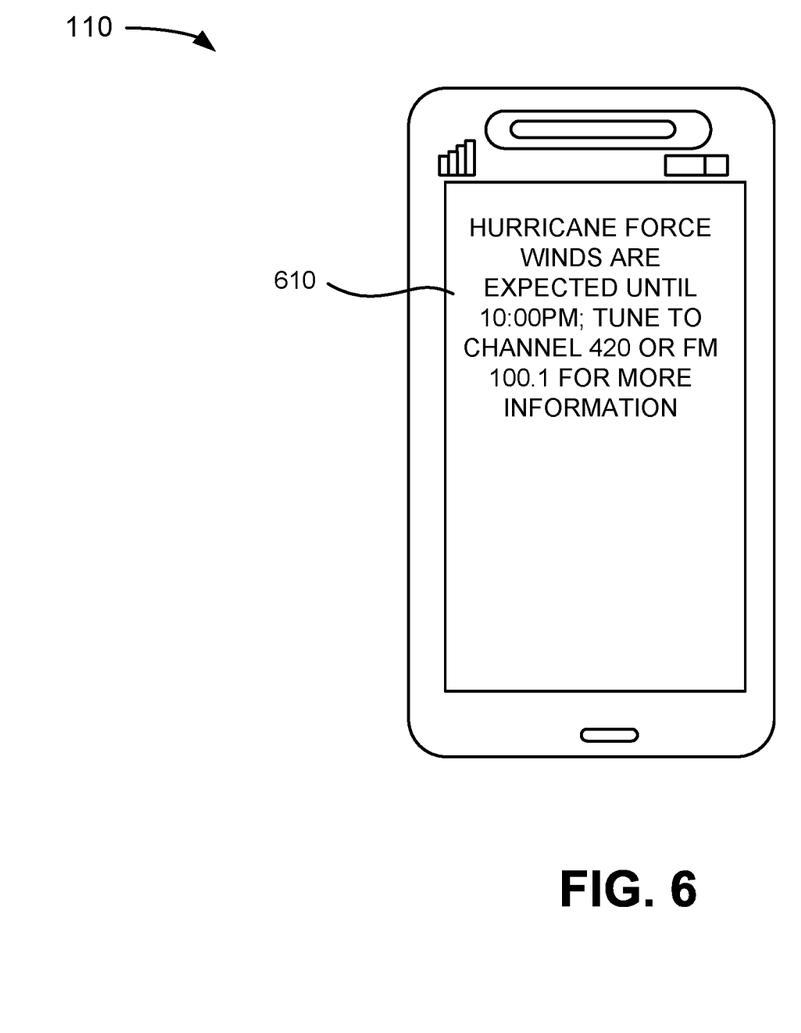
FIG. 6 illustrates a notification displayed on a user device in accordance with an exemplary implementation.

As another example, notification logic 350 may transmit a public service announcement to affected user devices 110. For example, referring to FIG. 6, notification logic 350 may transmit a public service type announcement when the anomaly corresponds to a large number of calls in a city/region to an emergency services system, such as a 911 system. In this example, user devices 110, such as user device 110 in FIG. 6, may receive and display a message, such as message 610. Message 610 may indicate that hurricane force winds are expected to continue for a period of time, and indicate additional sources from which the user can obtain information regarding the disaster, such as particular television and radio stations.

Implementations described herein monitor network and user device behavior to identify anomalous behavior. The user behavior information may be aggregated to determine if anomalous behavior exists for different types of behavior based on location, time, historical patterns, etc. The anomaly detection system may also determine whether notifications to network personnel and/or users should be transmitted. In each case, the anomalous behavior is identified and appropriate actions may be taken. This may help avoid fraud in networks, as well as improve user experience and satisfaction with respect to usage of network services.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to monitoring network communications to identify anomalous behavior. In some implementations, different service providers may aggregate data from their particular networks to determine if an entity is attempting to interfere with communications in a country or a large region of a country. For example, if a foreign entity is attempting to interrupt telecommunications in a country, different service providers may share information regarding detected anomalies, such as very large volumes of communications coming from a particular entity/country. In this manner, the service providers may be able to identify a concerted attack on a country's communication infrastructure relatively quickly and thwart any such attack. In a similar manner, service providers may be able to identify whether large numbers of electronic communications represent an attempt to provide false or misleading information to large numbers of user devices for malicious purposes and/or influence an event (e.g., an election).

In addition, any types of networks may be monitored and user behavior aggregated in the manner described above. For example, an online retailer may monitor user browsing, as well as user purchase history to identify anomalous behavior. This may help the online retailer prevent fraudulent purchases.

Further, while series of acts have been described with respect to FIGS. 5A and 5B, the order of the acts may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   monitoring, by a processing device, at least one of calls or traffic on a network;
   identifying, by the processing device, behavior associated with each of a plurality of user devices with respect to activity on the network;
   aggregating, by the processing device, information about the behavior associated with the plurality of user devices;
   determining, by the processing device, whether the aggregated information corresponds to an anomaly with respect to usage of the network;
   determining, by the processing device and when the aggregated information corresponds to the anomaly, whether the anomaly meets a threshold based on a type of anomaly and a number of user devices affected by the anomaly;
   identifying, by the processing device and when the anomaly meets the threshold, an area affected by the anomaly;
   identifying, when the aggregated information corresponds to the anomaly, user devices in the area affected by the anomaly;
   generating a notification in response to determining that the aggregated information corresponds to the anomaly; and
   transmitting the notification to the identified user devices in the area affected by the anomaly.

2. The method of claim 1, further comprising:
   identifying personnel associated with operating the network in the area affected by the anomaly; and
   transmitting the notification to the identified personnel.

3. The method of claim 1, wherein the generating a notification comprises generating at least one of a public service announcement or a link to a public service announcement.

4. The method of claim 1, further comprising:
   identifying at least one of a source or destination associated with the anomaly.

5. The method of claim 4, further comprising:
   determining a range of telephone numbers associated with the source or destination associated with the anomaly.

6. The method of claim 1, wherein the identifying behavior comprises:
   identifying an operating system (OS) associated with at least some of the plurality of user devices, and
   determining whether the at least some of the plurality of user devices are at least one of generating or receiving traffic associated with suspicious or anomalous activity.

7. The method of claim 1, wherein the determining whether the anomaly meets a threshold comprises:
   comparing, based on the aggregated information, a number of the plurality of user devices over a period of time to a threshold number of user devices associated with the type of anomaly.

8. The method of claim 1, further comprising:
   identifying an entity associated with the anomaly;
   identifying second user devices associated with the entity; and
   transmitting notifications to the identified second user devices.

9. The method of claim 1, wherein the identifying behavior comprises:
   monitoring at least one of telephone call records or network usage associated with the plurality of user devices.

10. The method of claim 1, further comprising:
    generating a baseline of user behavior for each of a plurality of types of network related behavior.

11. A system, comprising:
    a memory; and
    at least one device comprising a processor configured to execute instructions stored in the memory to:
      monitor at least one of calls or traffic on a network,
      identify behavior associated with each of a plurality of user devices with respect to activity on the network,
      aggregate information about the behavior associated with the plurality of user devices,
      determine whether the aggregated information corresponds to an anomaly with respect to usage of the network,
      determine, when the aggregated information corresponds to the anomaly, whether the anomaly meets a threshold based on a type of anomaly and a number of user devices affected by the anomaly,
      identify, when the anomaly meets the threshold, an area affected by the anomaly,
      identify, when the aggregated information corresponds to the anomaly, user devices in the area affected by the anomaly, generate a notification in response to determining that the aggregated information corresponds to the anomaly, and transmit the notification to the identified user devices in the area affected by the anomaly.

12. The system of claim 11, wherein the at least one device is further configured to:

identify personnel associated with operating the network in the area affected by the anomaly, and transmit the notification to the identified personnel.

13. The system of claim 11, wherein when generating a notification, the at least one device is configured to:

generate at least one of a public service announcement or a link to a public service announcement.

14. The system of claim 11, wherein the at least one device is further configured to:

identify an entity associated with the anomaly;

identify second user devices associated with the entity; and transmit notifications to the identified second user devices.

15. The system of claim 14, wherein when determining whether the anomaly meets the threshold, the at least one device is configured to:

compare, based on the aggregated information, a number of the plurality of user devices over a period of time to a threshold number of user devices associated with the type of anomaly.

16. The system of claim 11, wherein the at least one device is further configured to:

identify at least one of a source or destination associated with the anomaly, and determine a range of telephone numbers associated with the source or destination associated with the anomaly.

17. The system of claim 11, wherein when identifying behavior, the at least one device is further configured to:

monitor at least one of telephone call records or network usage associated with the plurality of user devices.

18. The system of claim 11, wherein at least one device is further configured to:

generate a baseline of user behavior for each of a plurality of types of network related behavior.

19. A non-transitory computer-readable medium having stored thereon sequences of instructions which, when executed by at least one processor, cause the at least one processor to:

monitor at least one of calls or traffic on a network;

identify behavior associated with each of a plurality of user devices with respect to activity on the network;

aggregate information about the behavior associated with the plurality of user devices, determine whether the aggregated information corresponds to an anomaly with respect to usage of the network;

determine, when the aggregated information corresponds to the anomaly, whether the anomaly meets a threshold based on a type of anomaly and a number of user devices affected by the anomaly;

identify, when the anomaly meets the threshold, an area affected by the anomaly, identify, when the aggregated information corresponds to the anomaly, user devices in the area affected by the anomaly;

generate a notification in response to determining that the aggregated information corresponds to the anomaly; and transmit the notification to the identified user devices in the area affected by the anomaly.

20. The non-transitory computer-readable medium of 19, wherein the instructions further cause the at least one processor to:

identify personnel associated with operating the network in the area affected by the anomaly; and transmit the notification to the identified personnel.

* * * * *